US011996248B2

(12) United States Patent
Dyer et al.

(10) Patent No.: US 11,996,248 B2
(45) Date of Patent: May 28, 2024

(54) SCISSOR-LINK FOR ACTUATOR PULL-OPEN FUNCTION

(71) Applicant: S&C Electric Company, Chicago, IL (US)

(72) Inventors: Thomas J. Dyer, Minneola, FL (US); Joseph W. Milton, Milwaukee, WI (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 18/075,857

(22) Filed: Dec. 6, 2022

(65) Prior Publication Data

US 2023/0197375 A1 Jun. 22, 2023

Related U.S. Application Data

(60) Provisional application No. 63/293,039, filed on Dec. 22, 2021.

(51) Int. Cl.
*H01H 21/22* (2006.01)
*H01H 21/04* (2006.01)

(52) U.S. Cl.
CPC ............ *H01H 21/22* (2013.01); *H01H 21/04* (2013.01)

(58) Field of Classification Search
CPC .. H01H 33/66; H01H 33/6606; H01H 33/664; H01H 33/666; H01H 33/6661; H01H 33/66261; H01H 3/00; H01H 3/02; H01H 3/30; H01H 3/3015; H01H 3/32; H01H 5/00; H01H 5/04; H01H 5/06; H01H 2001/22; H01H 2001/221; H01H 2003/32; H01H 21/00; H01H 21/12; H01H 21/22; H01H 21/221; H01H 21/04
See application file for complete search history.

(56) References Cited

U.S. PATENT DOCUMENTS

| | | | | |
|---|---|---|---|---|
| 10,923,298 | B1 * | 2/2021 | Chen | H01H 33/6662 |
| 2022/0103010 | A1 * | 3/2022 | Quinlan | H01H 33/53 |
| 2022/0329019 | A1 * | 10/2022 | Lanjekar | H01H 33/027 |

* cited by examiner

*Primary Examiner* — Anthony R Jimenez

(57) ABSTRACT

A switch assembly including an actuator assembly operable to magnetically latch a switch in a closed position, where the actuator assembly includes a cup member coupled to the drive rod opposite to the switch and an opening spring positioned within the cup member and being held in compression when the switch is latched closed, and where the cup member includes a central opening. The switch assembly further includes a scissor link having a first leg and a second leg pivotally attached at a pivot point, where one end of the first and second legs extend into the central opening and are rigidly attached to the cup member and an opposite end of the first and second legs extend through the cover, and where pulling the link away from the actuator assembly breaks the magnetic latch and opens the switch.

19 Claims, 4 Drawing Sheets

SCISSOR-LINK FOR ACTUATOR PULL-OPEN FUNCTION

CROSS-REFERENCE TO RELATED APPLICATION

This application claims the benefit of priority from the U.S. Provisional Application No. 63/293,039, filed on Dec. 22, 2021, the disclosure of which is hereby expressly incorporated herein by reference for all purposes.

BACKGROUND

Field

The present disclosure relates generally to a scissor link for linking an actuator to a control lever and, more particularly, to a scissor link for linking a magnetically latched actuator to a manual control lever to manually open the switch.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current but are 120° apart in phase. A number of three-phase and single-phase lateral lines are tapped off of the feeder that provide the medium voltage to various distribution transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Power distribution networks of the type referred to above often include switching devices, breakers, reclosers, interrupters, etc. that control the flow of power throughout the network and may be used to isolate faults within a faulted section of the network.

As part of its power distribution network, many utilities employ underground single-phase lateral circuits that feed residential and commercial customers. Often times these circuits are configured in a loop and fed from both ends, where an open location, typically at a transformer, is used in the circuit to isolate the two power sources. Although providing underground power cables protects circuits from faults created by things like storms and vegetation growth, underground cables still may break or otherwise fail as a result of corrosion and other things.

For a residential loop circuit of the type referred to above having two power sources, it is usually possible to reconfigure the open location in the circuit so that loads that are affected by a failed cable are fed by the other source and service to all of the loads is maintained. However, known processes for identifying the location of a cable failure and the subsequent reconfiguration of the open location often result in long power restoration times because workers are required to physically go to the transformers to test for power and then reconfigure the transformers to change the open location.

It has been proposed to provide bushing well interrupter devices employing vacuum interrupters and magnetic actuators in the existing transformers for these types of loop circuits that provide automatic protection, isolation and restoration of underground residential cable loops and methods to switch cable segments without handling cable elbows. These bushing well interrupter devices often have limited clearances to allow them to be installed in the existing transformers. The bushing well interrupter devices need to have a mechanical system for opening the vacuum interrupter that can be used by a local service person to overcome the actuator/spring forces if needed. Various types of links are known that coupled the actuator to a manual control lever. These links must open the vacuum interrupter, but cannot be used to close the vacuum interrupter or interfere with the normal closing of the vacuum interrupter, thus complicating the overall bushing well interrupter device design. In addition, the move toward smaller packaging of the bushing well interrupter devices is making the manual-open link a more difficult design challenge.

SUMMARY

The following discussion discloses and describes a switch assembly that includes an outer housing having a cover at one end, a switch provided within the housing at an end opposite to the cover, and a drive rod coupled to the switch at one end. The switch assembly also includes an actuator assembly operable to magnetically latch the switch in a closed position, where the actuator assembly includes a cup member coupled to the drive rod opposite to the switch and an opening spring positioned within the cup member and being held in compression when the switch is latched closed, and where the cup member includes a central opening. The switch assembly further includes a scissor link having a first leg and a second leg pivotally attached at a pivot point, where one end of the first and second legs extend into the central opening and are rigidly attached to the cup member and an opposite end of the first and second legs extend through the cover, and where pulling the link away from the actuator assembly breaks the magnetic latch and moves the drive rod to open the switch.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a scissor link for linking a magnetically latched actuator that magnetically opens and closes a switch to a manual control lever so as to manually open the switch is merely exemplary in nature, and is in no way intended to limit the invention or its applications or uses.

Figure 1:
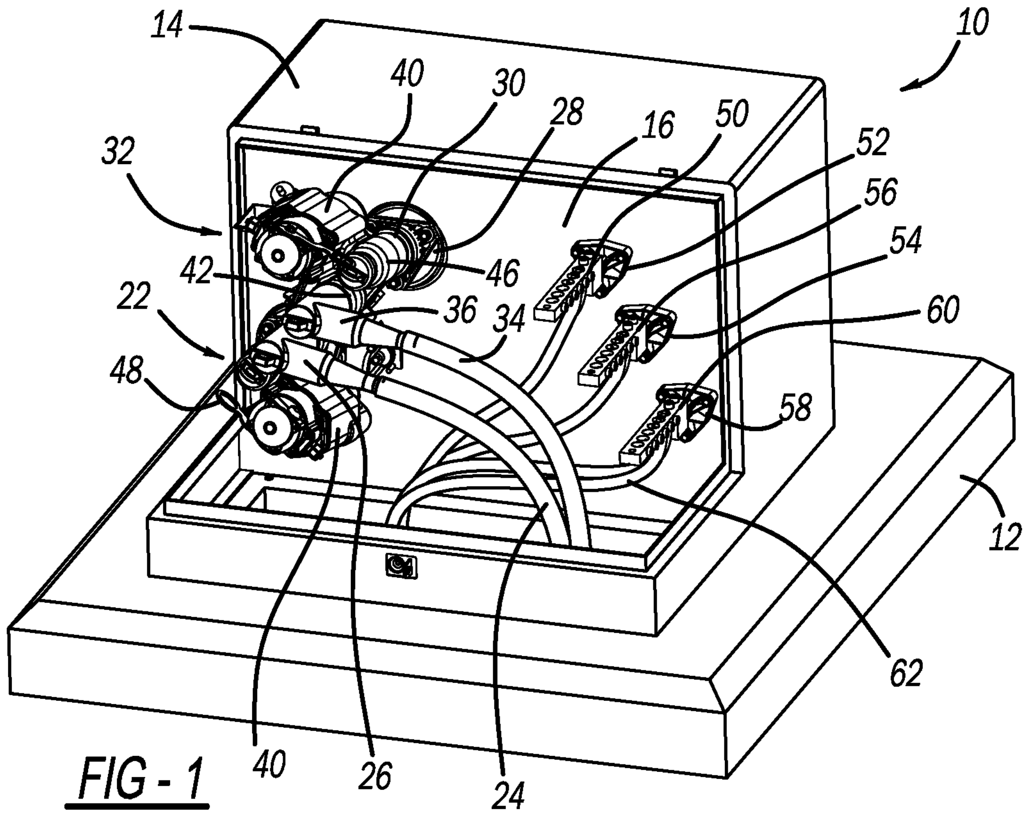
FIG. 1 is an isometric view of a pad mounted transformer employed in an underground residential loop circuit and including a pair of bushing well interrupter devices.
Figure 2:
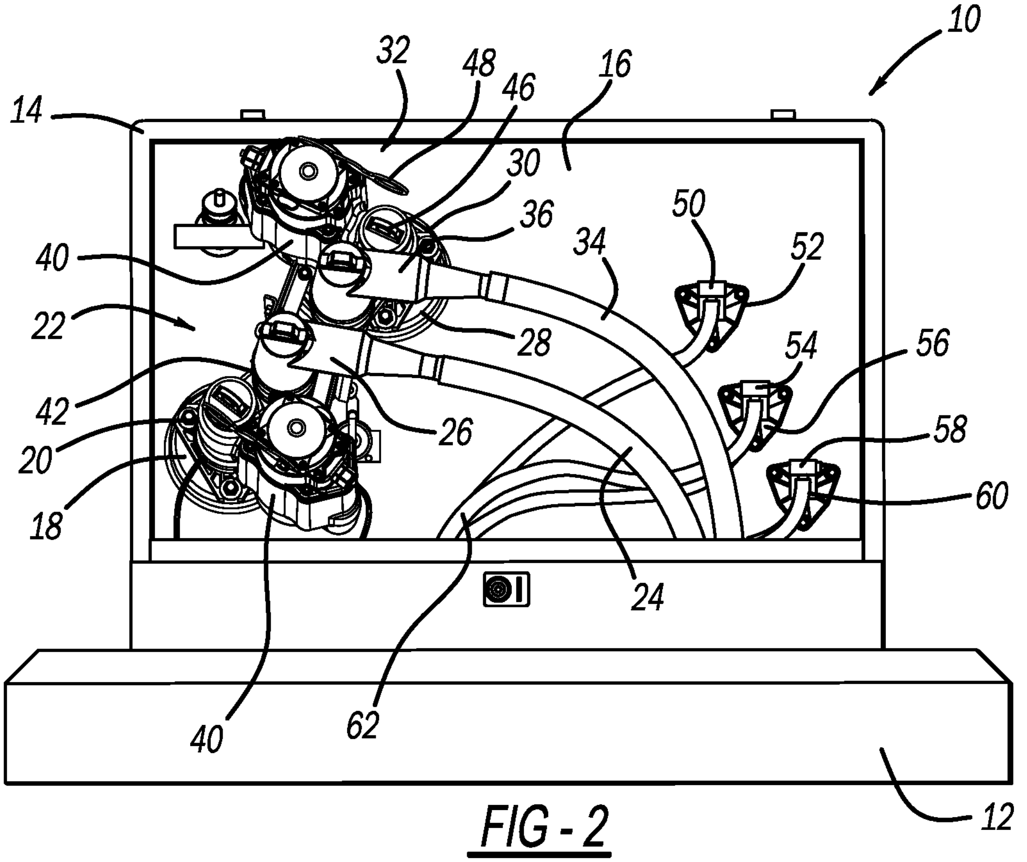
FIG. 2 is a front view of the transformer shown in FIG. 1.

FIG. 1 is an isometric view and FIG. 2 is a front view of a transformer 10 of the type that is mounted on a pad 12 that may be employed in an underground single-phase lateral loop circuit that feeds residential and commercial customers. The transformer 10 includes an enclosure 14 that houses the transformer primary and secondary coils (not shown) and other electrical components (not shown) of the transformer 10. A cover of the enclosure 14 has been removed to expose a panel 16 in the enclosure 14. A connector bushing 20 positioned within and coupled to a bushing well 18 extends through the panel 16 that accepts a bushing well interrupter device 22 that connects a power line 24 having an elbow connector 26 to one side of the primary coil and a connector bushing 30 positioned within and coupled to a bushing well 28 extends through the panel 16 that accepts a bushing well interrupter device 32 that connects a power line 34 having an elbow connector 36 to the other side of the primary coil, where the bushing well interrupter devices 22 and 32 are configured to provide automatic protection, isolation and power restoration of a lateral loop circuit without handling cable elbows. It is noted that the devices 22 and 32 are mirror images of each other to accommodate spacing for the existing features on the transformer 10. The devices 22 and 32 each include an outer enclosure 40, a load-break interface 42, a transformer interface 46 and a manual lever 48 for manually opening the devices 22 and 32. A 120 V positive connector 50 is coupled to the secondary coil through a connector bushing 52 in the panel 16, a 120 V negative connector 54 is coupled to the secondary coil through a connector bushing 56 in the panel 16, and a neutral connector 58 is coupled to the secondary coil through a connector bushing 60 in the panel 16. Distribution lines 62 are connected to the connectors 50, 54 and 58 to deliver low voltage power to the desired number of loads (not shown). In this example, the lines 24, 34 and 62 run underground.

Figure 3:
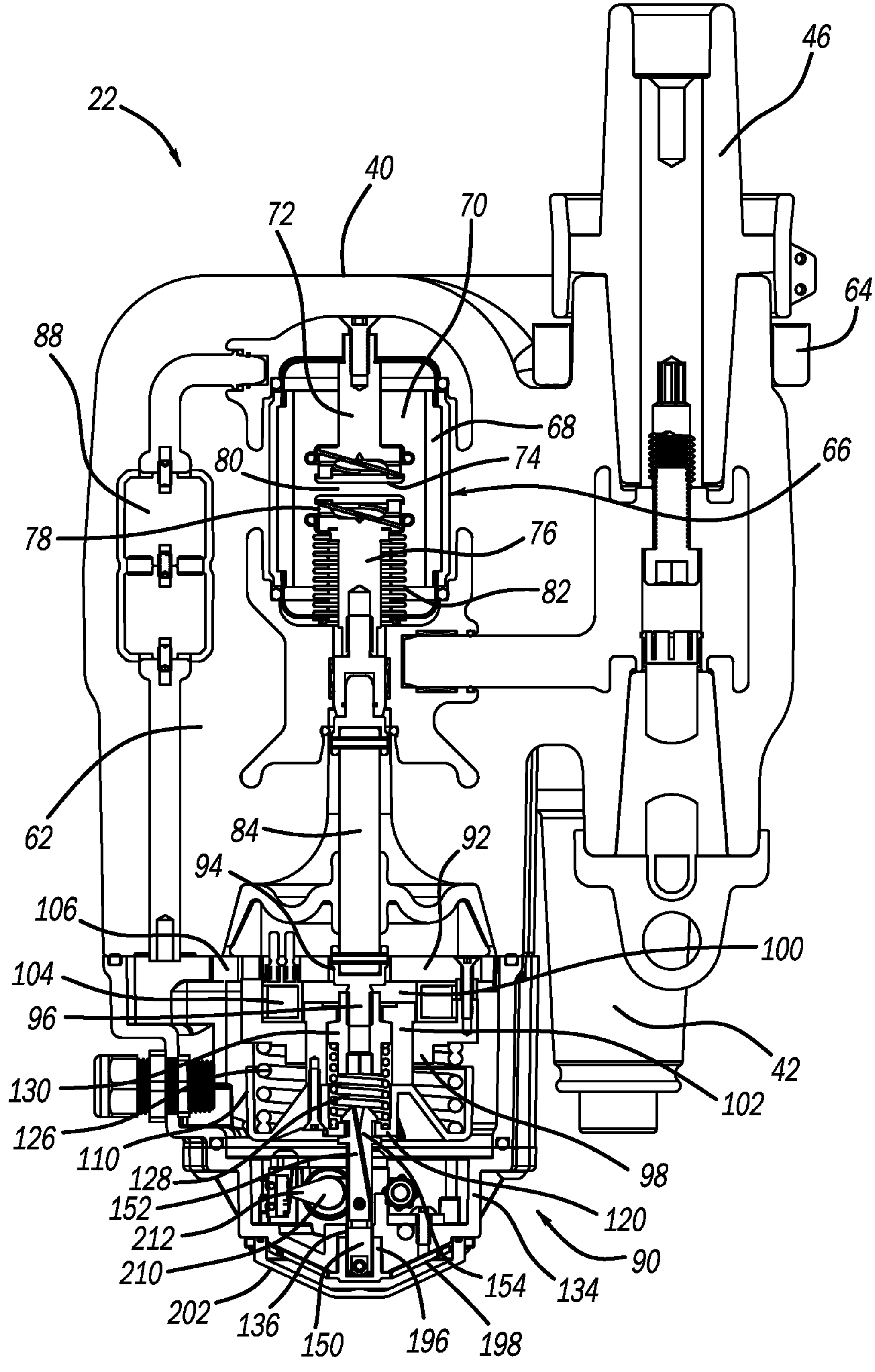
FIG. 3 is a cross-sectional type view of one of the bushing well interrupter devices in the transformer shown in FIG. 1.

FIG. 3 is a cross-sectional view of the bushing well interrupter device 22 showing one non-limiting example merely for illustrative purposes. The components within the enclosure 40 are encapsulated within an insulating medium 62, such as an epoxy, where many of the components are conductors operating at the medium voltage potential. A Rogowski coil 64 measures current flow through the bushing well interrupter device 22. The bushing well interrupter device 22 includes a vacuum interrupter 66 having a vacuum enclosure 68 defining a vacuum chamber 70, an upper fixed terminal 72 extending through the enclosure 68 and into the chamber 70 and having a contact 74 and a lower movable terminal 76 extending through the enclosure 68 and into the chamber 70 and having a contact 78, where a gap 80 is provided between the contacts 74 and 78 when the vacuum interrupter 66 is open. A bellows 82 allows the movable terminal 76 to move without affecting the vacuum integrity of the chamber 70. The movable terminal 76 is coupled to a drive rod 84 and capacitors 88 provide voltage sensing and power line communications (PLC).

Figure 4:
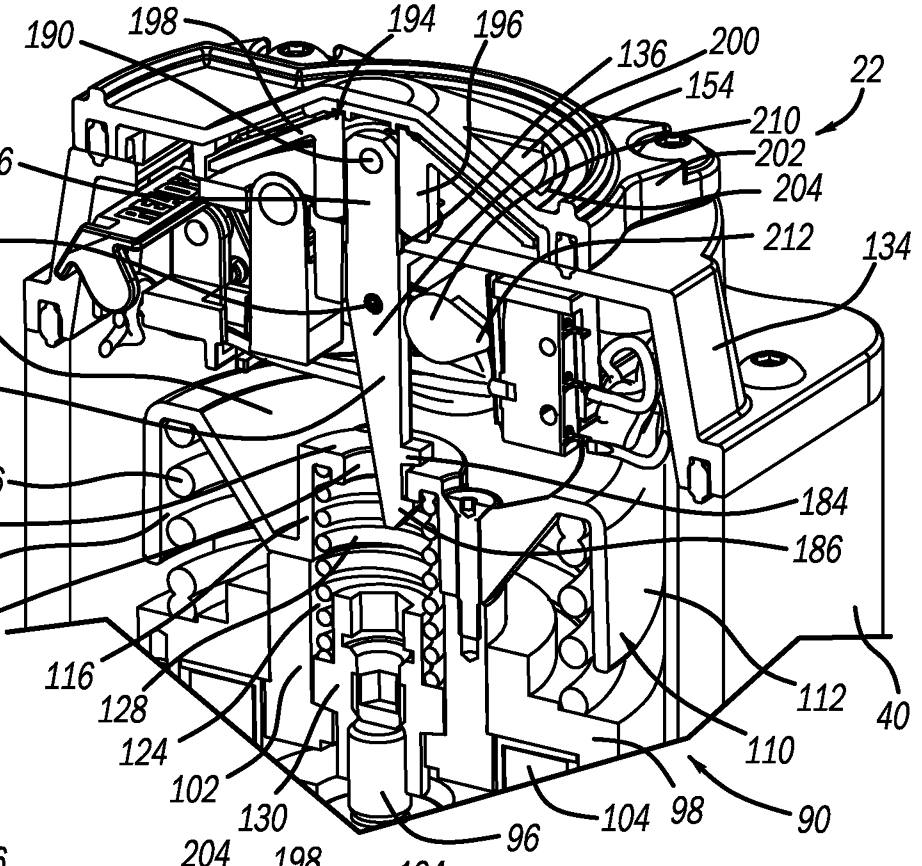
FIG. 4 is a broken-away, cross-sectional view of an actuator assembly in the bushing well interrupter device shown in FIG. 3.
Figure 5:
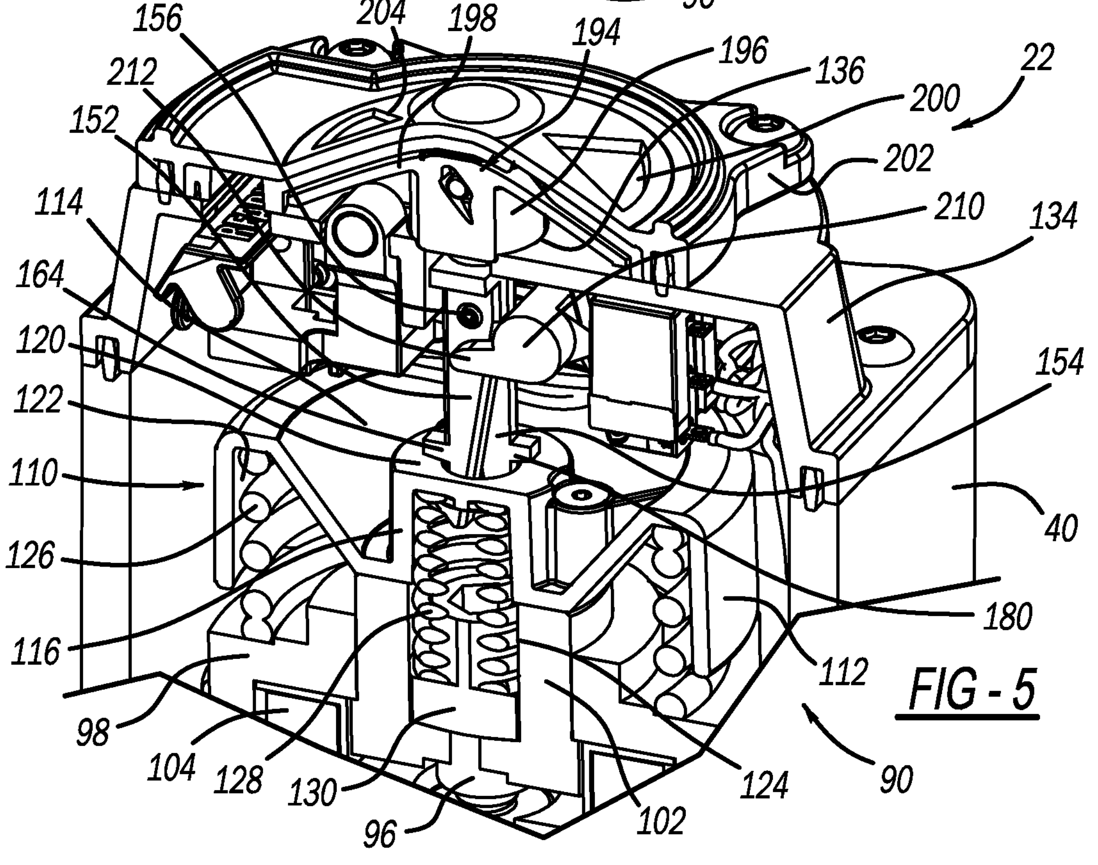
FIG. 5 is another broken-away, cross-sectional view of an actuator assembly in the bushing well interrupter device shown in FIG. 3.

The bushing well interrupter device 22 also includes an actuator assembly 90 that controls the drive rod 84 to open and close the vacuum interrupter 66. FIGS. 4 and 5 are broken-away cross-sectional views through different lines of the bushing well interrupter device 22 illustrating the actuator assembly 90. The actuator assembly 90 includes an annular latching plate 92 having a central opening 94 through which a coupling rod 96 extends and is coupled to the drive rod 84. The actuator assembly 90 also includes a stator 98 defining a central opening 100, where a magnetic plunger 102 is slidably positioned within the opening 100. A coil 104 is positioned against the stator 98 in the opening 100 and a series of permanent magnets 106 are positioned between the plate 92 and the stator 98. A cylindrical cup member 110 is rigidly secured to the plunger 102 and includes an outer wall 112, an indentation 114 and a central cylinder 116 having an opening 118 defining a rim 120, where an outer chamber 122 is defined between the wall 112 and the indentation 114 and an inner bore 124 is defined within the cylinder 116. An opening spring 126 is provided within the chamber 122 and is positioned against the stator 98 and a compliance spring 128 is provided within the bore 124. A stop member 130 is provided within the plunger 102 and is rigidly attached to the coupling rod 96. A cover 134 having a central opening 136 is bolted to the housing 40 and covers the actuator assembly 90.

Figure 6:
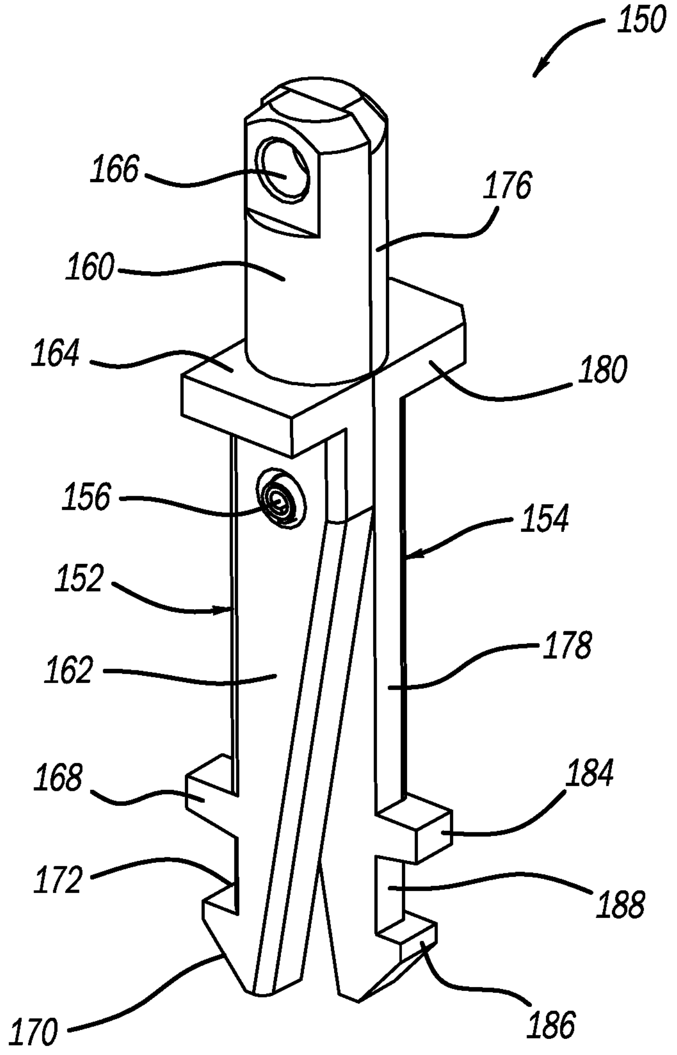
FIG. 6 is an isometric view of a scissor link used in the actuator assembly.

The actuator assembly 90 also includes a scissor link 150 having a pair of scissor legs 152 and 154 that pivot relative to each other on a pivot pin 156. FIG. 6 is an isometric view of the scissor link 150 separated from the bushing well interrupter device 22 showing the legs 152 and 154 in an open position. As will be discussed in detail below, the scissor link 150 provides a mechanism by which the vacuum interrupter 66 can be manually opened by the lever 48, but not manually closed. The leg 152 includes an upper half-cylindrical portion 160 and a lower body portion 162 separated by a tab 164. The upper portion 160 includes a hole 166 and the lower portion 162 includes opposing flanges 168 and 170 defining a slot 172. Likewise, the leg 154 includes an upper half-cylindrical portion 176 and a lower body portion 178 separated by a tab 180. The upper portion 176 includes a hole 182 and the lower portion 178 includes opposing flanges 184 and 186 defining a slot 188.

The legs 152 and 154 are pivoted closed (opposite to FIG. 6) and then inserted through the opening 136 and into the opening 118 until the slots 172 and 188 lined up with the rim 120. The legs 152 and 154 are then pivoted open (shown in FIG. 6) so that the rim 120 is positioned within the slots 172 and 188 and the flanges 168 and 184 are positioned at one side of the rim 120 and the flanges 170 and 186 are positioned at the other side of the rim 120. The legs 152 and 154 are held in this position by inserting a rod 190 through the holes 166 and 182. An open/close indicator unit 194 including a central cylinder 196 and a disk 198 having colored sections 200 in then installed by inserting the upper portions 160 and 176 into the cylinder 196, where the cylinder 196 includes a helical groove (not shown) in which the rod 190 is positioned and some of the color sections 200 are green indicating the vacuum interrupter 66 is open and some of the color sections 200 are red indicating the vacuum interrupter 66 is closed. A cap 202 including windows 204 is then positioned over the unit 194 and is bolted to the cover 134, where the sections 200 align with the windows 204.

A cam 210 including adjacent tabs 212 is rotated when the lever 48 is raised. This causes the tabs 212 to engage the tabs 164 and 180, which causes the link 150 to pull on the cup member 110 with the bias of the opening spring 126. This breaks the latch of the permanent magnets 106 and allows the vacuum interrupter 66 to open under the force of the opening spring 126. Lowering the lever 48 rotates the cam 210 back to a home position, but does not cause the link 150 to be engaged. Movement of the link 150 in the cylinder 196 causes the rod 190 to ride in the helical groove, which causes the indicator unit 194 to rotate. When the unit 194 rotates the red sections 200 move out from under the windows 204 and the green sections 200 move under the windows 204 to provide an indication that the bushing well interrupter device 22 is open.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A switch assembly comprising:

an outer housing including a cover at one end of the outer housing;

a switch provided within the outer housing at an end opposite to the cover;

a drive rod coupled to the switch at one end of the drive rod;

an actuator assembly operable to magnetically latch the switch in a closed position, the actuator assembly including a cup member coupled to the drive rod at an end of the drive rod opposite to the switch and an opening spring positioned within the cup member and being held in compression when the switch is latched closed, the cup member including a central opening; and a scissor link including a first leg and a second leg pivotally attached at a pivot point, wherein one end of each of the first and second legs extend into the central opening and are rigidly attached to the cup member and an opposite end of each of the first and second legs extend through the cover, and wherein pulling the scissor link away from the actuator assembly magnetically unlatches and moves the drive rod to open the switch.

2. The switch assembly according to claim 1 wherein the end of each of the first and second legs that extends into the central opening includes opposing flanges that define a slot, and wherein a rim defined by the central opening is positioned within the slots so as to couple the link to the cup member.

3. The switch assembly according to claim 1 wherein each of the first and second legs each include aligned holes at an end opposite to the cup member, and wherein a rod is inserted into the aligned holes to hold the ends of each of the first and second legs coupled to the cup member in a separated position.

4. The switch assembly according to claim 1 wherein each of the first and second legs include a tab, the switch assembly further comprising a cam that when rotated engages the tabs and causes the link to pull on the cup member.

5. The switch assembly according to claim 1 further comprising an open/close indicator unit including a cylinder, wherein the ends of each of the first and second legs that extend through the cover are positioned within and engage the cylinder so that when the scissor link pulls on the cup member movement of the link causes the indicator unit to rotate.

6. The switch assembly according to claim 5 further comprising a cap positioned over the indicator unit, the cap including windows that align with colored sections on the indicator unit to indicate whether the switch is open or closed.

7. The switch assembly according to claim 1 wherein the switch is a vacuum interrupter.

8. The switch assembly according to claim 1 wherein the switch assembly is a bushing well interrupter device.

9. The switch assembly according to claim 8 wherein the bushing well interrupter device is part of a transformer.

10. The switch assembly according to claim 9 wherein the transformer is part of an underground residential loop circuit.

11. A bushing well interrupter device for connecting and disconnecting a transformer to a line, the device comprising:

an outer housing including a cover at one end of the outer housing;

a vacuum interrupter provided within the housing at an end of the outer housing opposite to the cover;

a drive rod coupled to the vacuum interrupter at one end of the drive rod;

an actuator assembly operable to magnetically latch the vacuum interrupter in a closed position, the actuator assembly including a cup member coupled to the drive rod at an end of the drive rod opposite to the vacuum interrupter and an opening spring positioned within the cup member and being held in compression when the vacuum interrupter is latched closed, the cup member including a central opening; and a scissor link including a first leg and a second leg pivotally attached at a pivot point, the first leg including opposing flanges that define a slot at one end, a hole at an opposite end and a tab therebetween and the second leg including opposing flanges that define a slot at one end, a hole at an opposite end and a tab therebetween, wherein the end of the first and second legs including the flanges extend into the central opening so that a rim defined by the central opening is positioned within the slots so as to couple the scissor link to the cup member and the opposite end of the first and second legs including the holes extend through the cover so that a rod inserted into the holes hold the ends of the first and second legs coupled to the cup member in a separated position, and wherein pulling the scissor link away from the actuator assembly magnetically unlatches and moves the drive rod to open the switch.

12. The device according to claim 11 further comprising a cam that when rotated engages the tabs and causes the link to pull on the cup member.

13. The device according to claim 11 further comprising an open/close indicator unit including a cylinder, wherein each of the ends of the first and second legs that extend through the cover are positioned within and engage the cylinder so that when the scissor link pulls on the cup member movement of the link causes the indicator unit to rotate.

14. The device according to claim 13 further comprising a cap positioned over the indicator unit, the cap including windows that align with colored sections on the indicator unit to indicate whether the switch is open or closed.

15. A scissor link for coupling an actuator to a lever, the scissor link comprising a first leg and a second leg pivotally attached at a pivot point, the first leg including opposing flanges that define a slot at one end, a hole at an opposite end and a tab therebetween and the second leg including opposing flanges that define a slot at one end, a hole at an opposite end and a tab therebetween, wherein the end of the first and second legs including the flanges are coupled to the actuator, the opposite ends of the first and second legs including the holes accept a rod inserted into the holes to hold the ends of the first and second legs coupled to the actuator in a separated position, and wherein the tabs are coupled to the lever.

16. The link according to claim 15 wherein the actuator opens and closes a vacuum interrupter.

17. The link according to claim 16 wherein the actuator and vacuum interrupter are part of a bushing well interrupter device.

18. The link according to claim 17 wherein the bushing well interrupter device is part of a transformer.

19. The link according to claim 18 wherein the transformer is part of an underground residential loop circuit.

* * * * *